(12) United States Patent
Hetrich

(10) Patent No.: US 10,413,761 B2
(45) Date of Patent: Sep. 17, 2019

(54) LINE RETRACTION DEVICE HAVING A DAMPER ASSEMBLY

(71) Applicant: MSA Technology, LLC, Cranberry Township, PA (US)

(72) Inventor: Mitchell H. Hetrich, Greenville, PA (US)

(73) Assignee: MSA Technology, LLC, Cranberry Township, PA (US)

(*) Notice: Subject to any disclaimer, the term of this patent is extended or adjusted under 35 U.S.C. 154(b) by 621 days.

(21) Appl. No.: 15/058,458

(22) Filed: Mar. 2, 2016

(65) Prior Publication Data
US 2017/0252591 A1 Sep. 7, 2017

(51) Int. Cl.
| | |
|---|---|
| *A62B 35/00* | (2006.01) |
| *B65H 75/44* | (2006.01) |
| *B65H 75/48* | (2006.01) |
| *F16F 9/14* | (2006.01) |
| *A62B 1/08* | (2006.01) |
| *A62B 1/12* | (2006.01) |

(52) U.S. Cl.
CPC ............ *A62B 35/0093* (2013.01); *A62B 1/08* (2013.01); *A62B 1/12* (2013.01); *B65H 75/4418* (2013.01); *B65H 75/4436* (2013.01); *B65H 75/4471* (2013.01); *B65H 75/486* (2013.01); *F16F 9/145* (2013.01)

(58) Field of Classification Search
CPC ......... A62B 35/0092; A62B 1/08; A62B 1/12; B65H 75/4418; B65H 75/4436; B65H 75/4471; B65H 75/486; F16F 9/145
See application file for complete search history.

(56) References Cited

U.S. PATENT DOCUMENTS

| | | | | |
|---|---|---|---|---|
| 4,256,098 A | * | 3/1981 | Swan | A62B 35/0093 128/845 |
| 4,446,884 A | | 5/1984 | Rader, Jr. | |
| 5,186,289 A | * | 2/1993 | Wolner | A62B 1/12 182/232 |
| 6,234,417 B1 | * | 5/2001 | Sauder | B65H 75/4442 242/381 |

(Continued)

FOREIGN PATENT DOCUMENTS

| | | | | |
|---|---|---|---|---|
| WO | 2005028352 A1 | 3/2005 | | |
| WO | WO-2005028352 A1 | * | 3/2005 | ......... B65H 75/4442 |

(Continued)

*Primary Examiner* — Katherine W Mitchell
*Assistant Examiner* — Candace L Bradford
(74) *Attorney, Agent, or Firm* — The Webb Law Firm

(57) ABSTRACT

A line retraction device includes a rotatable drum having a line associated therewith, with the line including a first end directly or indirectly attached to the drum and a second end opposite the first end, and at least one retraction member biasing the drum in a first rotational direction of the drum opposite a second rotational direction of the drum, where the drum is configured to: (i) retract the line when the drum moves in the first rotational direction; and (ii) payout the line when the drum moves in the second rotational direction. The device further including a damper assembly configured to provide rotational resistance to the drum in: (i) the first rotational direction of the drum as the line is being retracted; and (ii) the second rotational direction as the line is being paid out.

11 Claims, 22 Drawing Sheets

(56) References Cited

U.S. PATENT DOCUMENTS

| | | | |
|---|---|---|---|
| 6,799,738 B2 | 10/2004 | Sauder et al. | |
| 8,511,434 B2 | 8/2013 | Blomberg | |
| 9,199,103 B2 * | 12/2015 | Hetrich | A62B 1/10 |
| 2001/0048043 A1 * | 12/2001 | Sauder | B65H 75/4442 |
| | | | 242/381 |
| 2007/0023557 A1 | 2/2007 | Rankin, VI | |
| 2009/0178887 A1 * | 7/2009 | Reeves | A62B 1/10 |
| | | | 182/239 |
| 2011/0278095 A1 | 11/2011 | Hetrich et al. | |

FOREIGN PATENT DOCUMENTS

| | | | | |
|---|---|---|---|---|
| WO | 2008008225 A2 | 1/2008 | | |
| WO | WO-2008008225 A2 * | 1/2008 | | A62B 1/10 |
| WO | 2010031133 A1 | 3/2010 | | |
| WO | WO-2010031133 A1 * | 3/2010 | | A62B 35/0093 |

* cited by examiner

LINE RETRACTION DEVICE HAVING A DAMPER ASSEMBLY

BACKGROUND OF THE INVENTION

Field of the Invention

The present invention relates generally to safety systems and arrangements and, in particular, to a line retraction device, such as a fall arrest or controlled descent device, including self-retracting lanyards and the like, which may be used in connection with a harness to protect the wearer from a sudden, accelerated fall arrest event, as well as a line retraction device having a damper assembly.

Description of the Related Art

A line retraction device may be used in a variety of situations and applications. For example, one type of line retraction device is in the form of a lanyard, such as a self-retracting lanyard (SRL), which are commonly used for fall protection in industrial environments, as well as in connection with recreational activities. Self-retracting lanyards have numerous industrial end uses, including, but not limited to, construction, manufacturing, hazardous materials/remediation, asbestos abatement, spray painting, sand blasting, welding, mining, numerous oil and gas industry applications, electric and utility, nuclear energy, paper and pulp, sanding, grinding, stage rigging, roofing, scaffolding, telecommunications, automotive repair and assembly, warehousing, and railroading.

SRLs frequently include a housing that includes a rotatable drum or hub around which a line, typically made of webbing, cable, rope, and/or synthetic material is wound. The hub rotates to unwind (or "payout") the line from its housing when a certain level of tension is purposefully applied. When that degree of tension is reduced or released, the hub can slowly rotate in a reverse direction causing the line to retract or rewind about itself in a desired manner. Certain housings further include a braking mechanism or assembly for resisting hub rotation when an inelastic line (e.g., a steel cable) unwinds too rapidly, i.e., faster than its predetermined maximum velocity for normal payout. A sudden line payout is an indication that the lanyard wearer/user has experienced a fall that needs to be stopped or arrested.

During an unintentional, accidental fall, an engagement and braking arrangement in the housing of the SRL engages, which prevents the SRL wearer from falling too far. In addition, SRLs typically connect at one end to an anchorage point, often on the support structure at or near where a user is performing certain assigned tasks. The line from the SRL housing is clamped (or otherwise attached) to a harness worn by the user. The maximum allowable stopping forces and distances are defined by known industry standards. The stopping force provided by a brake is inversely proportional to the stopping distance, i.e., the higher the force, the shorter the distance, and vice versa. As a result, the force cannot exceed the maximum allowed by standards, and yet it must also be large enough so that the extension distance does not exceed the maximum, also regulated by these standards.

The drum of the SRL is biased to retract the line back into the housing of the SRL. As noted above, the line will payout from the drum as the user walks away from the SRL and will also retract back into the housing as the user walks toward the SRL. When a user disconnects the line from their harness and releases the line, "freewheeling" can occur, which is the unrestrained retraction of the line back into the housing of the SRL. When the end of the line reaches the SRL, an end connector on the line can impact the housing of the SRL and damage the housing, the end connector, and/or the internal components of the SRL. Such an impact may also jam the SRL requiring the repair of the SRL and, in some circumstances, injure the user. The issues caused by the impact of the end connection against the housing may create a dangerous condition where the SRL may not function properly the next time it is used. Proper line retraction is typically controlled by the user either directly by hand or indirectly with a tag line secured to the main line of the SRL.

SUMMARY OF THE INVENTION

Accordingly and generally, provided is an improved line retraction device having a damper assembly.

In one preferred and non-limiting embodiment or aspect, provided is a line retraction device, comprising: a rotatable drum having a line associated therewith, the line including a first end directly or indirectly attached to the drum and a second end opposite the first end; at least one retraction member biasing the drum in a first rotational direction of the drum opposite a second rotational direction of the drum, wherein the drum is configured to: (i) retract the line when the drum moves in the first rotational direction; and (ii) payout the line when the drum moves in the second rotational direction; and a damper assembly configured to provide rotational resistance to the drum in: (i) the first rotational direction of the drum as the line is being retracted; and (ii) the second rotational direction as the line is being paid out.

In one preferred and non-limiting embodiment or aspect, the damper assembly comprises at least one fixed element and at least one moveable element, the at least one moveable element moving in conjunction with the drum. In another preferred and non-limiting embodiment or aspect, the line retraction device comprises a shaft having a first end and a second end, the shaft connected to and rotatable with the drum, the at least one moveable element connected to the shaft. In another preferred and non-limiting embodiment or aspect, the damper assembly further comprises a damper housing receiving the at least one fixed element and the at least one moveable element, and wherein the damper housing contains a fluid in fluid communication with at least a portion of the at least one fixed element and at least a portion of the at least one moveable element. In another preferred and non-limiting embodiment or aspect, the fluid comprises a silicone fluid.

In another preferred and non-limiting embodiment or aspect, the at least one fixed element comprises a first set of arcuate-shaped vanes radially spaced from a second set of arcuate-shaped vanes, the first set of vanes and the second set of vanes each arranged in a circular shape. In another preferred and non-limiting embodiment or aspect, the at least one moveable element comprises a first annular vane radially spaced from a second annular vane, the first and second annular vanes of the at least one moveable element intermeshed with the first and second sets of vanes of the at least one fixed element.

In one preferred and non-limiting embodiment or aspect, the line retraction device comprises a housing assembly that receives the drum and the retraction member, the retraction member comprising a power spring having a first end fixed relative to the housing assembly and a second end secured directly or indirectly to the drum, e.g., to a shaft. In another preferred and non-limiting embodiment or aspect, the housing assembly comprises a main housing and a cover, the cover defining an opening that receives a first end of the shaft, and wherein the damper assembly is secured to at least one of the following: a side of the cover, a shaft, the drum, or any combination thereof. In another preferred and non-limiting embodiment or aspect, the line retraction device comprises a brake assembly configured to prevent rotation of the drum upon activation of the brake assembly. In another preferred and non-limiting embodiment or aspect, the brake assembly comprises a speed-sensitive mechanism having an activated position and a non-activated position, the speed-sensitive mechanism rotatable in conjunction with the drum and configured to transition from the non-activated position to the activated position upon a predetermined rotation speed of the drum.

In one preferred and non-limiting embodiment or aspect, the retraction member comprises a power spring. In one preferred and non-limiting embodiment or aspect, an end connector is secured to the second end of the line, the end connector configured to be releasably connected to a user of the line retraction device.

In one preferred and non-limiting embodiment or aspect, provided is a line retraction device, comprising: a housing; a rotatable drum received at least partially within the housing and having a line associated therewith, the line including a first end directly or indirectly attached to the drum and a second end opposite the first end; at least one retraction member biasing the drum in a first rotational direction of the drum opposite a second rotational direction of the drum, wherein the drum is configured to: (i) retract the line when the drum moves in the first rotational direction; and (ii) payout the line when the drum moves in the second rotational direction; a damper assembly configured to provide rotational resistance to the drum in: (i) the first rotational direction of the drum as the line is being retracted; and (ii) the second rotational direction as the line is being paid out.

In one preferred and non-limiting embodiment or aspect, the damper assembly comprises at least one fixed element, at least one moveable element, and a damper housing receiving the at least one fixed element and the at least one moveable element. In another preferred and non-limiting embodiment or aspect, the damper housing contains a fluid in fluid communication with at least a portion of the at least one fixed element and at least a portion of the at least one moveable element. In another preferred and non-limiting embodiment or aspect, the at least one fixed element comprises a first set of arcuate-shaped vanes radially spaced from a second set of arcuate-shaped vanes, the first set of vanes and the second set of vanes each arranged in a substantially circular shape, and wherein the at least one moveable element comprises a first annular vane radially spaced from a second annular vane, the first and second annular vanes of the at least one moveable element intermeshed with the first and second sets of vanes of the at least one fixed element.

In one preferred and non-limiting embodiment or aspect, the housing receives the drum and the retraction member, the retraction member comprising a power spring having a first end fixed relative to the housing assembly and a second end secured directly or indirectly to the drum.

In one preferred and non-limiting embodiment or aspect, provided is a fall protection device, comprising: a rotatable drum having a line associated therewith, the line including a first end directly or indirectly attached to the drum and a second end opposite the first end; at least one retraction member biasing the drum in a first rotational direction of the drum opposite a second rotational direction of the drum, wherein the drum is configured to: (i) retract the line when the drum moves in the first rotational direction; and (ii) payout the line when the drum moves in the second rotational direction; and a damper assembly configured to provide rotational resistance to the drum in: (i) the first rotational direction of the drum as the line is being retracted; and (ii) the second rotational direction as the line is being paid out.

In one preferred and non-limiting embodiment or aspect, the damper assembly comprises at least one fixed element, at least one moveable element, and a damper housing receiving the at least one fixed element and the at least one moveable element.

Further preferred and non-limiting embodiments or aspects will now be described in the following numbered clauses.

Clause 1: A line retraction device, comprising: a rotatable drum having a line associated therewith, the line including a first end directly or indirectly attached to the drum and a second end opposite the first end; at least one retraction member biasing the drum in a first rotational direction of the drum opposite a second rotational direction of the drum, wherein the drum is configured to: (i) retract the line when the drum moves in the first rotational direction; and (ii) payout the line when the drum moves in the second rotational direction; and a damper assembly configured to provide rotational resistance to the drum in: (i) the first rotational direction of the drum as the line is being retracted; and (ii) the second rotational direction as the line is being paid out.

Clause 2: The line retraction device of clause 1, wherein the damper assembly comprises at least one fixed element and at least one moveable element, the at least one moveable element moving in conjunction with the drum.

Clause 3: The line retraction device of clauses 1 or 2, further comprising a shaft having a first end and a second end, the shaft connected to and rotatable with the drum, the at least one moveable element connected to the shaft.

Clause 4: The line retraction device of any of clauses 1-3, wherein the damper assembly further comprises a damper housing receiving the at least one fixed element and the at least one moveable element, and wherein the damper housing contains a fluid in fluid communication with at least a portion of the at least one fixed element and at least a portion of the at least one moveable element.

Clause 5: The line retraction device of any of clauses 1-4, wherein the fluid comprises a silicone fluid.

Clause 6: The line retraction device of any of clauses 1-5, wherein the at least one fixed element comprises a first set of arcuate-shaped vanes radially spaced from a second set of arcuate-shaped vanes, the first set of vanes and the second set of vanes each arranged in a circular shape.

Clause 7: The line retraction device of any of clauses 1-6, wherein the at least one moveable element comprises a first annular vane radially spaced from a second annular vane, the first and second annular vanes of the at least one moveable element intermeshed with the first and second sets of vanes of the at least one fixed element.

Clause 8: The line retraction device of any of clauses 1-7, further comprising a housing assembly that receives the drum and the retraction member, the retraction member comprising a power spring having a first end fixed relative to the housing assembly and a second end secured directly or indirectly to the drum.

Clause 9: The line retraction device of any of clauses 1-8, wherein the housing assembly comprises a main housing and a cover, and wherein the damper assembly is secured to at least one of the following: a side of the cover, a shaft, the drum, or any combination thereof.

Clause 10: The line retraction device of any of clauses 1-9, further comprising a brake assembly configured to prevent rotation of the drum upon activation of the brake assembly.

Clause 11: The line retraction device of any of clauses 1-10, wherein the brake assembly comprises a speed-sensitive mechanism having an activated position and a non-activated position, the speed-sensitive mechanism rotatable in conjunction with the drum and configured to transition from the non-activated position to the activated position upon a predetermined rotation speed of the drum.

Clause 12: The line retraction device of any of clauses 1-11, wherein the retraction member comprises a power spring.

Clause 13: The line retraction device of any of clauses 1-12, wherein an end connector is secured to the second end of the line, the end connector configured to be releasably connected to a user of the line retraction device.

Clause 14: A line retraction device, comprising: a housing; a rotatable drum received at least partially within the housing and having a line associated therewith, the line including a first end directly or indirectly attached to the drum and a second end opposite the first end; at least one retraction member biasing the drum in a first rotational direction of the drum opposite a second rotational direction of the drum, wherein the drum is configured to: (i) retract the line when the drum moves in the first rotational direction; and (ii) payout the line when the drum moves in the second rotational direction; and a damper assembly configured to provide rotational resistance to the drum in: (i) the first rotational direction of the drum as the line is being retracted; and (ii) the second rotational direction as the line is being paid out.

Clause 15: The fall protection device of clause 14, wherein the damper assembly comprises at least one fixed element, at least one moveable element, and a damper housing receiving the at least one fixed element and the at least one moveable element.

Clause 16: The fall protection device of clauses 14 or 15, wherein the damper housing contains a fluid in fluid communication with at least a portion of the at least one fixed element and at least a portion of the at least one moveable element.

Clause 17: The fall protection device of any of clauses 14-16, wherein the at least one fixed element comprises a first set of arcuate-shaped vanes radially spaced from a second set of arcuate-shaped vanes, the first set of vanes and the second set of vanes each arranged in a substantially circular shape, and wherein the at least one moveable element comprises a first annular vane radially spaced from a second annular vane, the first and second annular vanes of the at least one moveable element intermeshed with the first and second sets of vanes of the at least one fixed element.

Clause 18: The line retraction device of any of clauses 14-17, wherein the housing receives the drum and the retraction member, the retraction member comprising a power spring having a first end fixed relative to the housing assembly and a second end secured directly or indirectly to the drum.

Clause 19: A fall protection device, comprising: a rotatable drum having a line associated therewith, the line including a first end directly or indirectly attached to the drum and a second end opposite the first end; at least one retraction member biasing the drum in a first rotational direction of the drum opposite a second rotational direction of the drum, wherein the drum is configured to: (i) retract the line when the drum moves in the first rotational direction; and (ii) payout the line when the drum moves in the second rotational direction; and a damper assembly configured to provide rotational resistance to the drum in: (i) the first rotational direction of the drum as the line is being retracted; and (ii) the second rotational direction as the line is being paid out.

Clause 20: The fall protection device of clause 19, wherein the damper assembly comprises at least one fixed element, at least one moveable element, and a damper housing receiving the at least one fixed element and the at least one moveable element.

These and other features and characteristics of the present invention, as well as the methods of operation and functions of the related elements and structures, and the combination of parts, and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
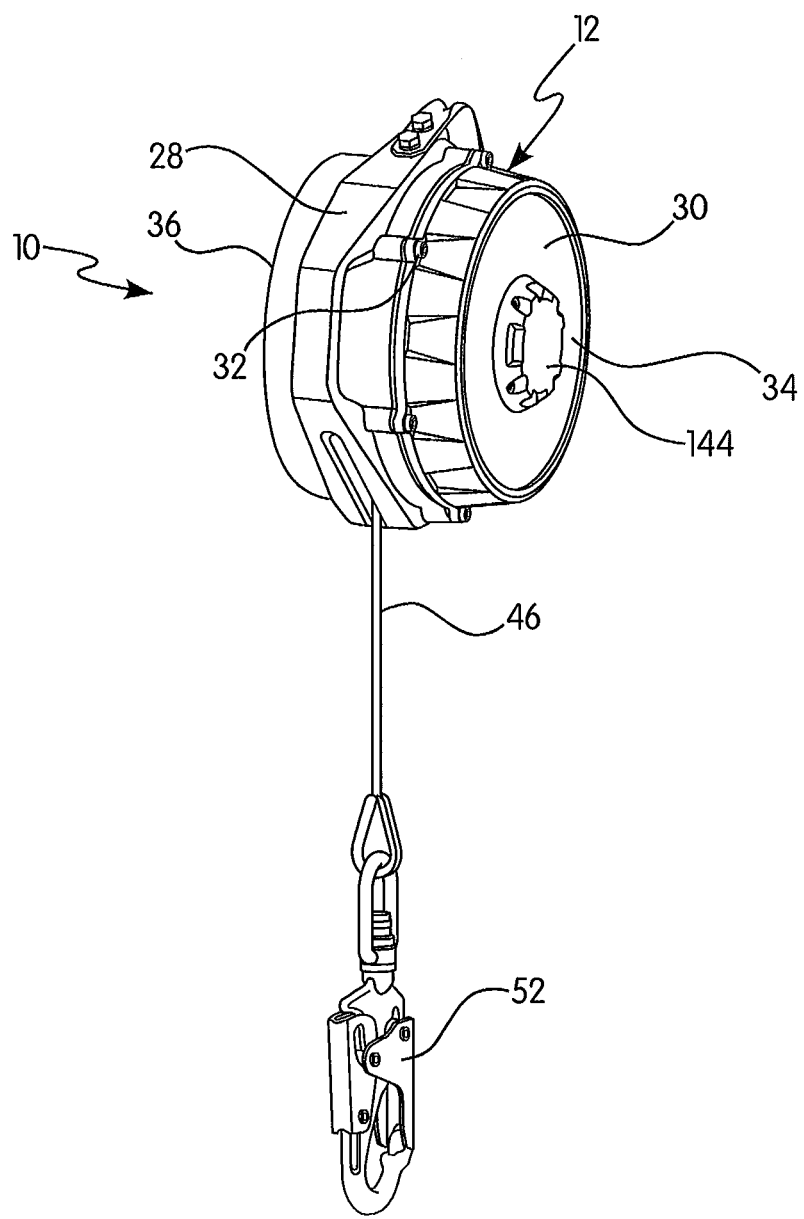
FIG. 1 is a front perspective view of a fall protection device according to one aspect of the present invention.
Figure 2:
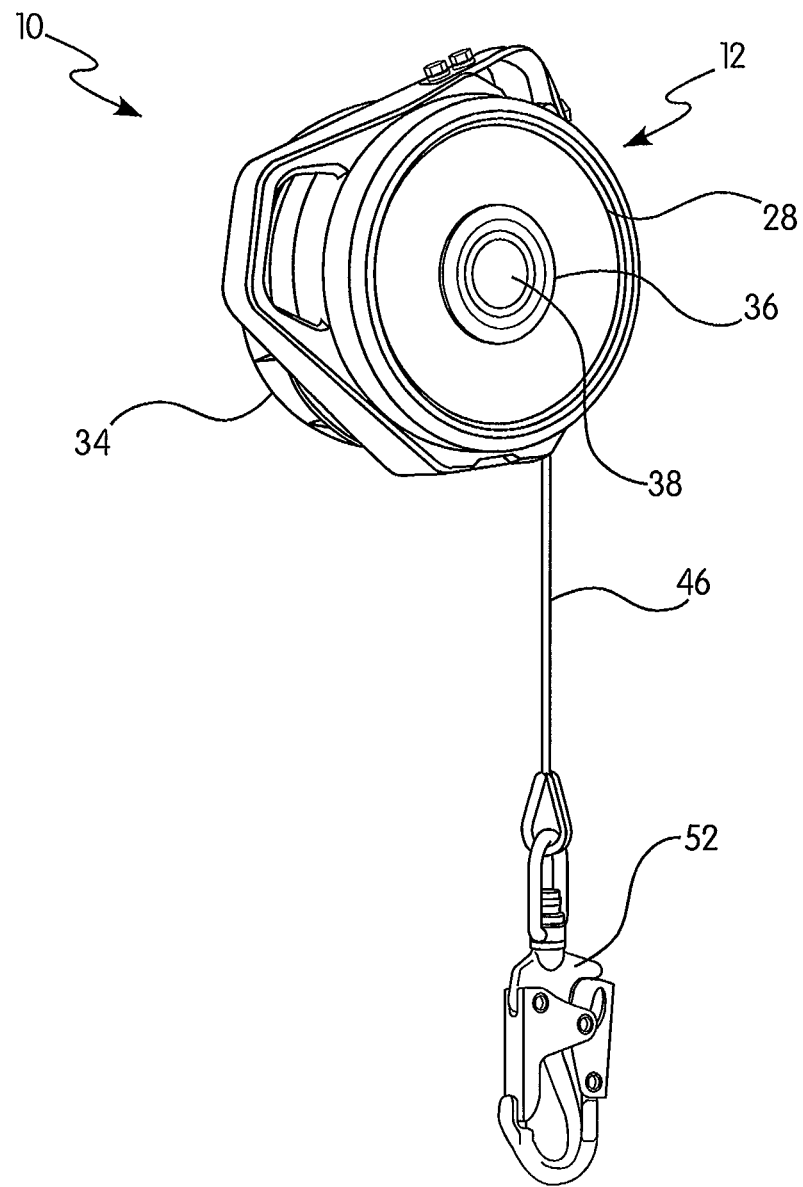
FIG. 2 is rear perspective view of the fall protection device of FIG. 1 according to one aspect of the present invention.
Figure 3:
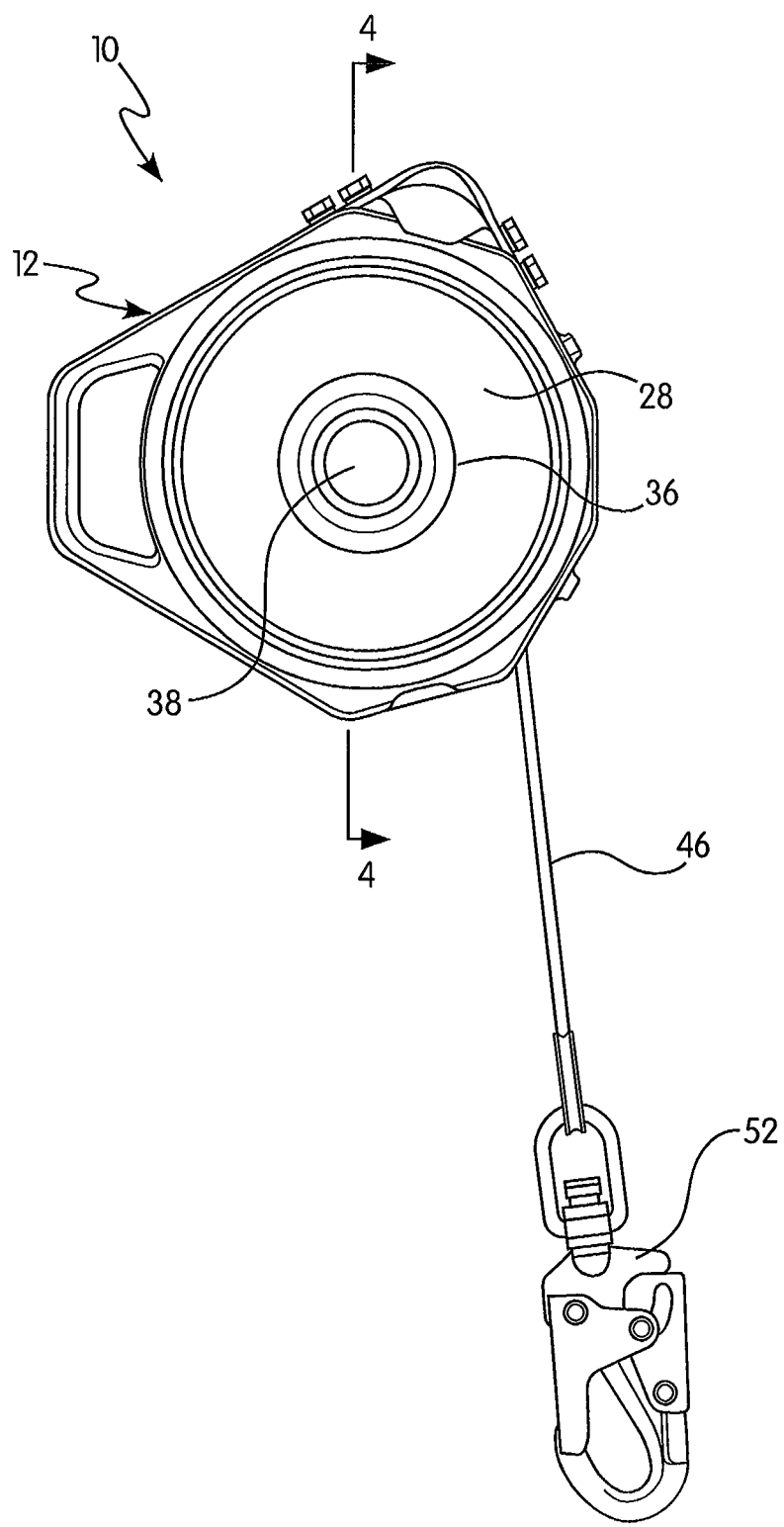
FIG. 3 is a rear view of the fall protection device of FIG. 1 according to one aspect of the present invention.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

As illustrated in FIGS. 1-22, certain preferred and non-limiting embodiments or aspects of a line retraction device 10 for use in industrial environments and recreational activities is provided. The line retraction device 10 can be implemented in any appropriate application or environment where a user or worker engages in activities in an elevated position and requires some protection in the event of a fall. Further, in one preferred and non-limiting embodiment or aspect, the line retraction device 10 of the present invention is in the form of a fall protection device or lanyard, such as a self-retracting lanyard. The line retraction device 10 protects the user should an unintentional, accidental fall commence. The line retraction device 10 is configured to prevent the user from falling too far or stopping too quickly as discussed in more detail below.

Referring to FIGS. 1-5, and in one preferred and non-limiting embodiment or aspect, the line retraction device 10 includes a drum 14 having a line 46, such as a lifeline, a retraction member 20 biasing the drum 14 in a first rotational direction of the drum 14, and a damper assembly 22. The drum 14 is configured to (i) retract the line 46 when the drum 14 moves in the first rotational direction and (ii) payout the line 46 when the drum 14 moves in the second rotational direction. The damper assembly 22 is configured to provide rotational resistance to the drum 14 in (i) the first rotational direction of the drum 14 as the line 46 is being retracted and (ii) the second rotational direction as the line 46 is being paid out.

In one preferred and non-limiting embodiment or aspect, and referring again to FIGS. 1-5, the line retraction device includes a housing assembly 12, the drum 14, a shaft 16, a brake assembly 18, the retraction member 20, and the damper assembly 22. The housing assembly 12 includes a main housing 28 that at least partially receives the brake assembly 18 and a spring cover 30 that receives the retraction member 20. The spring cover 30 is secured to the main housing 28 via bolts 32, although any suitable fastening arrangement may be utilized. The shaft 16 is received by the housing assembly 12 and extends from a first end 34 of the housing assembly 12 to a second end 36 of the housing assembly 12 positioned opposite the first end 34. The second end 36 of the main housing 28 includes a housing cover 38 adjacent to the shaft 16. In another preferred and non-limiting embodiment or aspect, the brake assembly 18 may be in the form of or replaced by a leading edge energy absorbing arrangement, such as a tear-tape arrangement connecting the end connector 52 to the line 46.

In one preferred and non-limiting embodiment or aspect, and referring to FIGS. 4, 5, 16, and 17, the drum 14, includes a body 42 defining a recessed portion 44 that receives the line 46. The line 46 is wound about the drum 14 and includes a first end 50 attached to the drum 14 and a second end 48 positioned opposite the first end 50. An end connector 52 is secured to the second end 48 of the line 46 and is configured to be releasably secured to a user of the line retraction device 10. The body 42 of the drum 14 includes a hub 54 that receives the shaft 16. The drum 14 is rotatable within the housing assembly 12 and is configured to payout or retract the line 46 from and to the housing assembly 12.

In one preferred and non-limiting embodiment or aspect, and referring to FIGS. 4, 5, and 14-17, the shaft 16 has a first end 60 and a second end 62 positioned opposite the first end 60. The first end 60 of the shaft 16 includes an engagement surface 64 that is configured to mate with the damper assembly 22 as discussed in more detail below. In one preferred and non-limiting embodiment or aspect, the engagement surface 64 is a square drive surface, although other suitable engagement surfaces may be utilized. In one preferred and non-limiting embodiment or aspect, the shaft 16 is rotatable within the housing assembly 12 and is received by first and second bushings 66, 68 provided within the spring cover 30 and the main housing 28, respectively. The shaft 16 is connected to and rotatable with the drum 14. In particular, the shaft 16 includes a key 70 received within a recess 72 defined by the shaft 16. The key 70 cooperates with a corresponding recess 74 in the hub 54 of the drum 14 such that the shaft 16 rotates in conjunction with drum 14. Accordingly, paying out the line 46 from the drum 14 or retracting line 46 into the drum 14 will rotate the drum 14 and the shaft 16. In one preferred and non-limiting embodiment or aspect, axial movement of the shaft 16 within the housing assembly 12 is restricted by the bushing 68 with the drum 14 being restricted axially by a plurality of retaining rings 76, although any other suitable arrangement for restricting axial movement may be provided. In another preferred and non-limiting embodiment or aspect, the shaft 16 is not rotatable, and instead is fixed with respect to the housing assembly 12, such that the drum 14 rotates around the shaft 16. In another preferred and non-limiting embodiment or aspect, the damper assembly 22 is secured to at least one of the following: a side of the cover 30, the shaft 16, the drum 14, or any combination thereof.

In one preferred and non-limiting embodiment or aspect, and referring to FIGS. 5 and 18-22, the brake assembly 18 is configured to prevent rotation of the drum 14 upon activation of the brake assembly 18. The brake assembly 18 includes a speed-sensitive mechanism 80 having an activated position and a non-activated position. The speed-sensitive mechanism 80 is secured to the shaft 16 and rotatable in conjunction with the drum 14. The speed-sensitive mechanism 80 is configured to transition from the non-activated position to the activated position upon a predetermined rotation speed of the drum 14. The predetermined rotation speed of the drum 14 to transition the speed-sensitive mechanism 80 from the non-activated position to the activation position is a known range of rotation speed that is indicative of a fall event. More specifically, the line 46 will payout from the drum 14 during a fall event and cause the drum 14 and speed-sensitive device 80 to rotate at the predetermined rotation speed via their connection to the shaft 16.

Figure 18:
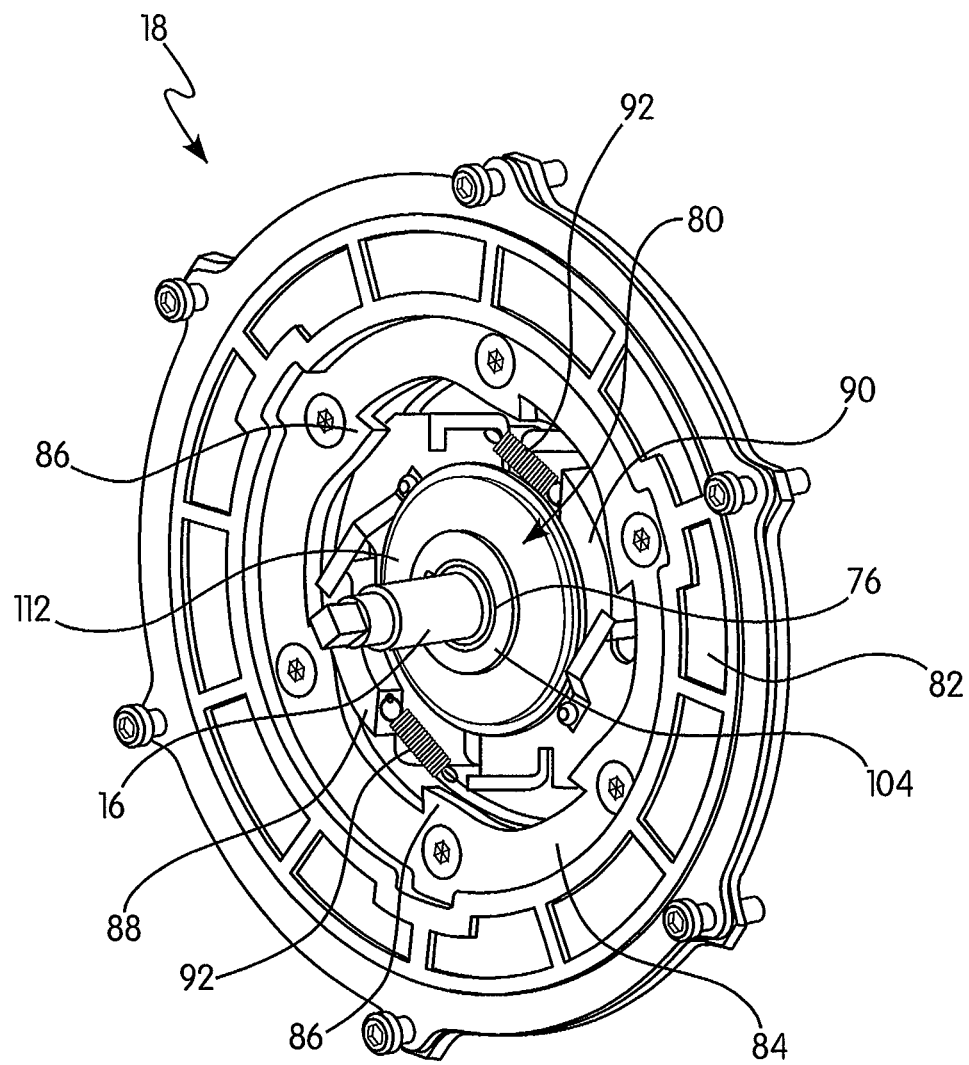
FIG. 18 is a perspective view of a brake assembly and shaft according to one aspect of the present invention.
Figure 19:
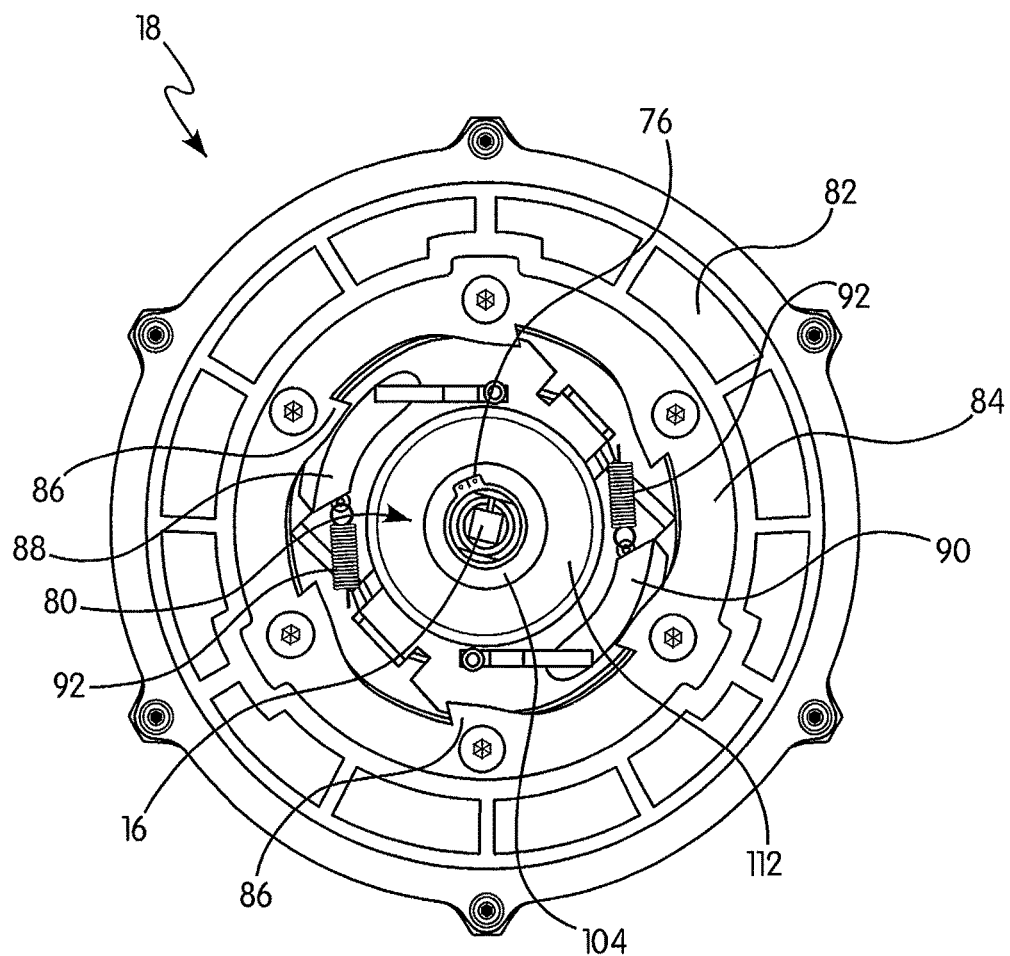
FIG. 19 is a front view of the brake assembly and shaft of FIG. 18 according to one aspect of the present invention.

In one preferred and non-limiting embodiment or aspect, and as shown in FIG. 18, the brake assembly 18 further includes a brake case 82 secured to the main housing 28 of the housing assembly 12. The brake case 82 includes a ratchet member 84 having a plurality of teeth 86 spaced apart from each other. The speed-sensitive mechanism 80 includes first and second pawls 88, 90 that are moveable radially outward into engagement with the teeth 86 of the ratchet member 84 when the speed-sensitive mechanism 80 transitions from the non-activated position to the activated position. The first and second pawls 88, 90 are biased radially inward via springs 92, although any other suitable biasing arrangement may be provided. The biasing force needs to be overcome in order for the first and second pawls 88, 90 to move radially outward and into engagement with the ratchet member 84. In particular, when the drum 14, shaft 16, and speed-sensitive mechanism 80 are rotating at the predetermined rotation speed indicative of a fall event, the centripetal force provided by the springs 92 is not sufficient to keep the first and second pawls 88, 90 from engaging the ratchet member 84 thereby allowing the pawls 88, 90 to move radially outward into engagement with the ratchet member 84, which is fixed relative to the housing assembly 12.

Accordingly, the brake assembly 18 is configured to slow and stop rotation of the drum 14 through the engagement of the speed-sensitive mechanism 80 with the brake case 82. However, additional line 46 will continue to extend from the housing assembly 12 based upon the forces of the fall and the weight of the user attached to the end connector 52 through the use of the brake assembly 18. In particular, a sudden stopping of rotation would exert unsafe force on the user, possibly causing bodily harm. The brake assembly 18 is configured to ensure a more gradual slowing process, thereby reducing the fall forces exerted on the user as discussed below.

Figure 20:
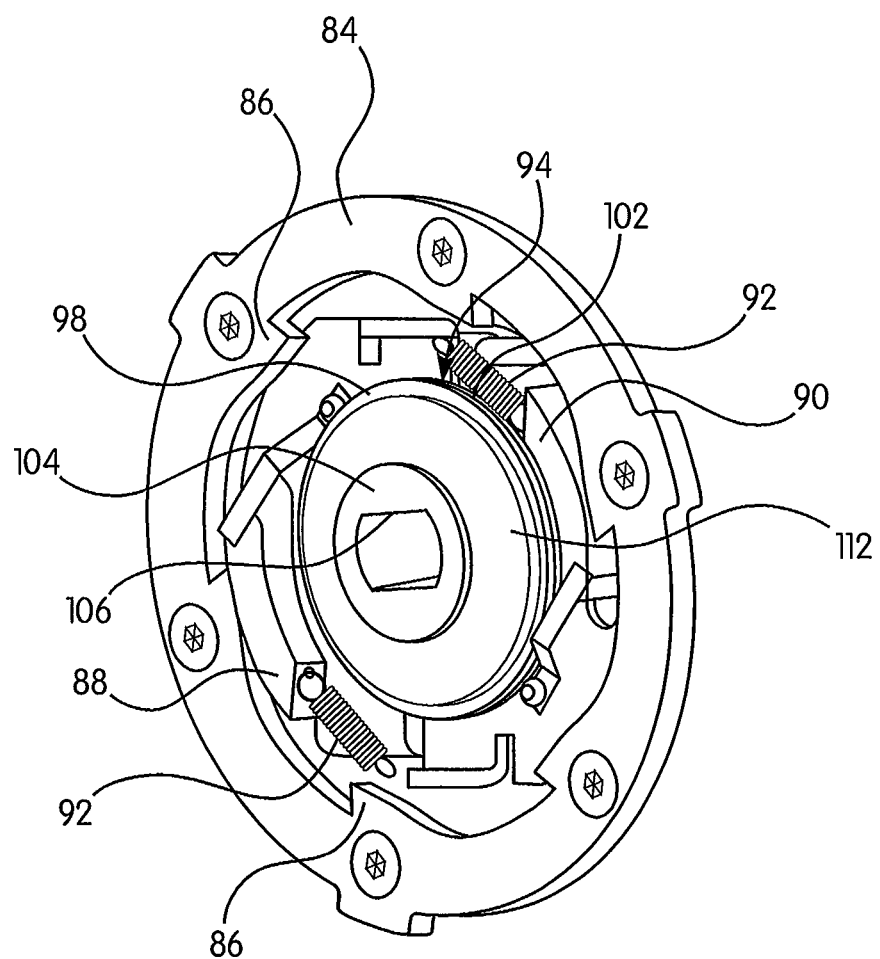
FIG. 20 is a front perspective view of a speed-sensitive mechanism according to one aspect of the present invention.
Figure 21:
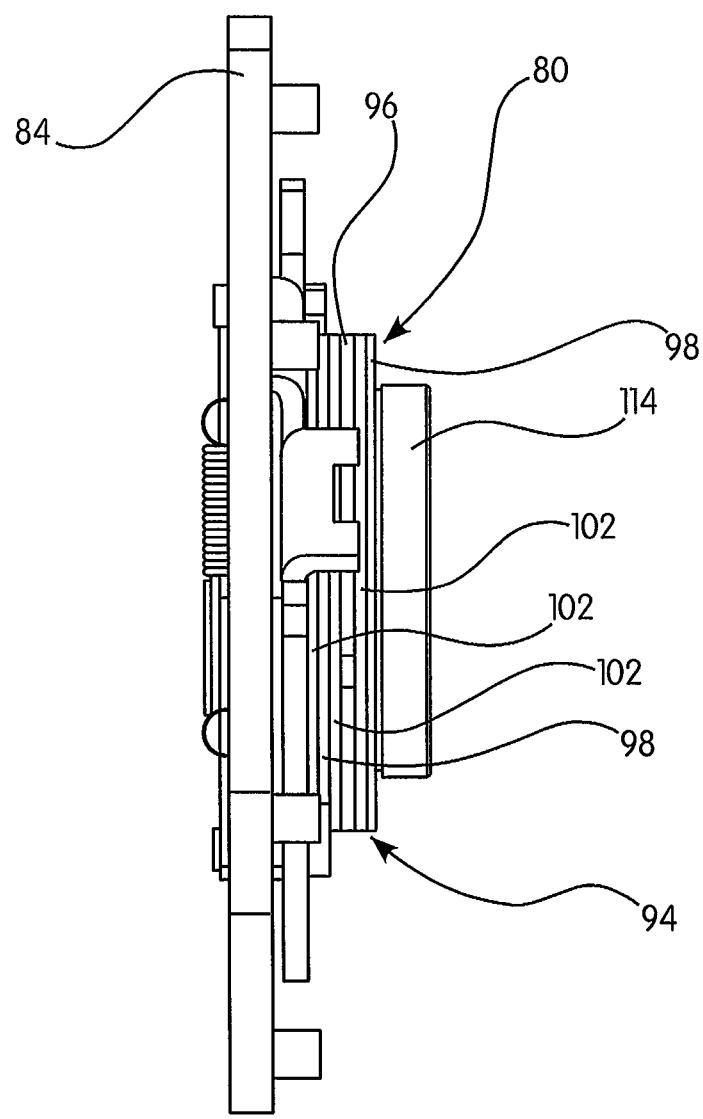
FIG. 21 is a side view of the speed-sensitive mechanism of FIG. 20 according to one aspect of the present invention.
Figure 22:
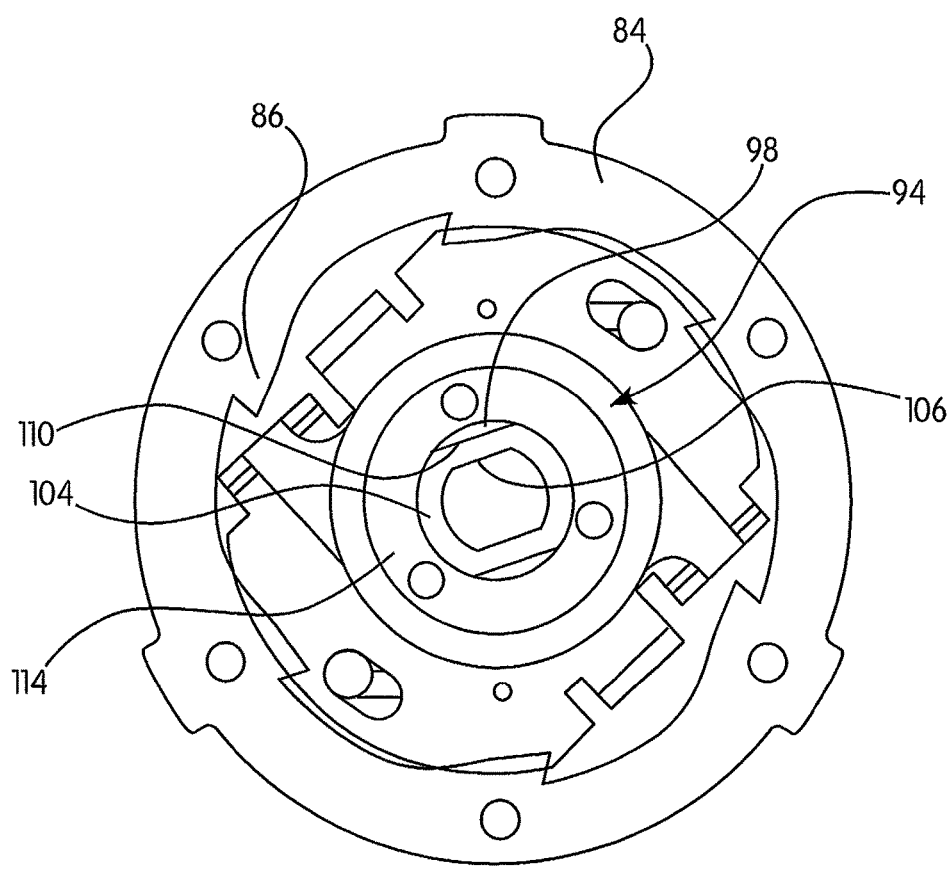
FIG. 22 is a rear view of the speed-sensitive mechanism of FIG. 20 according to one aspect of the present invention.

In one preferred and non-limiting embodiment or aspect, and referring to FIGS. 4 and 18-22, the speed-sensitive mechanism 80 is connected to the shaft 16 via a friction assembly 94 to provide the gradual slowing and stopping process of the drum 14 during a fall event. The friction assembly 94 includes a brake washer 96, a plurality of spacers 98, and friction members 102, which transfer rotation of the speed-sensitive mechanism 80 to the shaft 16. In particular, as shown in FIGS. 20-22 with the shaft 16 omitted for clarity, the speed-sensitive mechanism 80 is secured to the shaft 16 via engagement between a hub 104 and the plurality of spacers 98. The hub 104 receives the shaft 16 and is rotationally fixed relative to the shaft 16 via corresponding flat portions 106, 108 of the hub 104 and the shaft 16. Similarly, flat portions 110 of the plurality of spacers 98 engage the flat portion 106 of the hub 104 to rotationally fix the plurality of spacers 98 relative to the hub 104. The brake washer 96, plurality of spacers 98, and friction members 102 are forced together via a Belleville washer 112 and a nut 114 such that the plurality of spacers 98 and the brake washer 96 each engage one of the friction members 102. Although the Belleville washer 112 and the nut 114 are provided, other suitable arrangements for facilitating the engagement between the brake washer 96, spacers 98, and friction members 102 may be utilized. The friction members 102 may be annular brake pads, although other suitable friction members may be utilized.

During normal operation of the line retraction device 10, there is no relative rotational movement between the shaft 16 and the speed-sensitive mechanism 80 due to the engagement and friction between the plurality of spacers 98, the brake washer 96, and the friction members 102. However, during a fall event, the speed-sensitive mechanism 80 will be positioned in the activated position with the pawls 88, 90 engaging the ratchet member 84 and the shaft 16 and the plurality of spacers 98 will move relative to the friction members 102 based upon the forces of the fall and the weight of the user attached to the end connector 52. In this manner, the forces acting on the shaft 16 caused by a fall event will be sufficient to overcome the frictional forces between the friction members 102 and the plurality of spacers 98. The engagement between the friction members 102 and the plurality of spacers 98 will gradually slow the shaft 16 and the plurality of spacers 98; thereby gradually slowing the descent of a user attached to the end connector 52 during a fall event.

Figure 4:
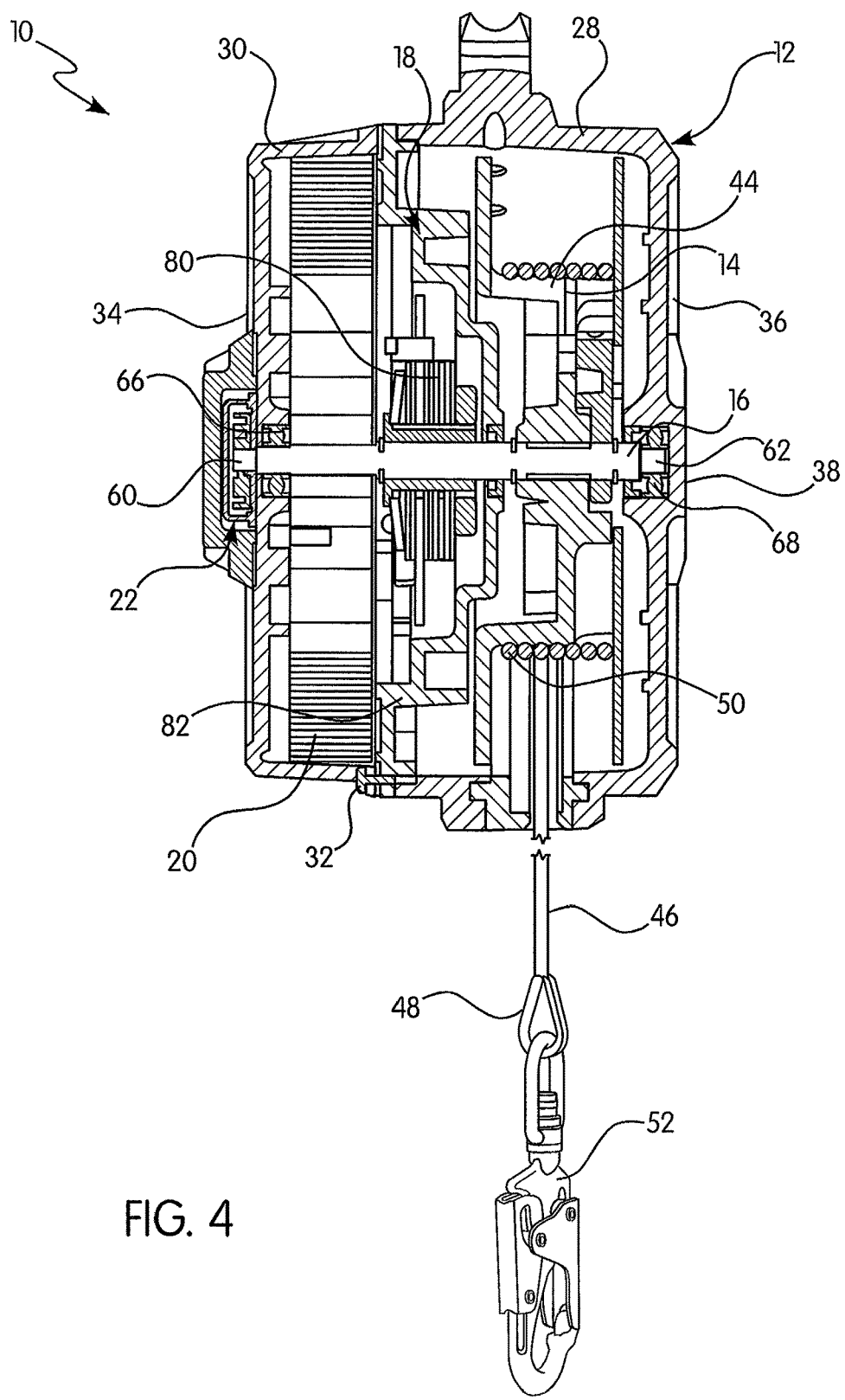
FIG. 4 is a cross-sectional view along line 4-4 shown in FIG. 3 according to one aspect of the present invention.
Figure 5:
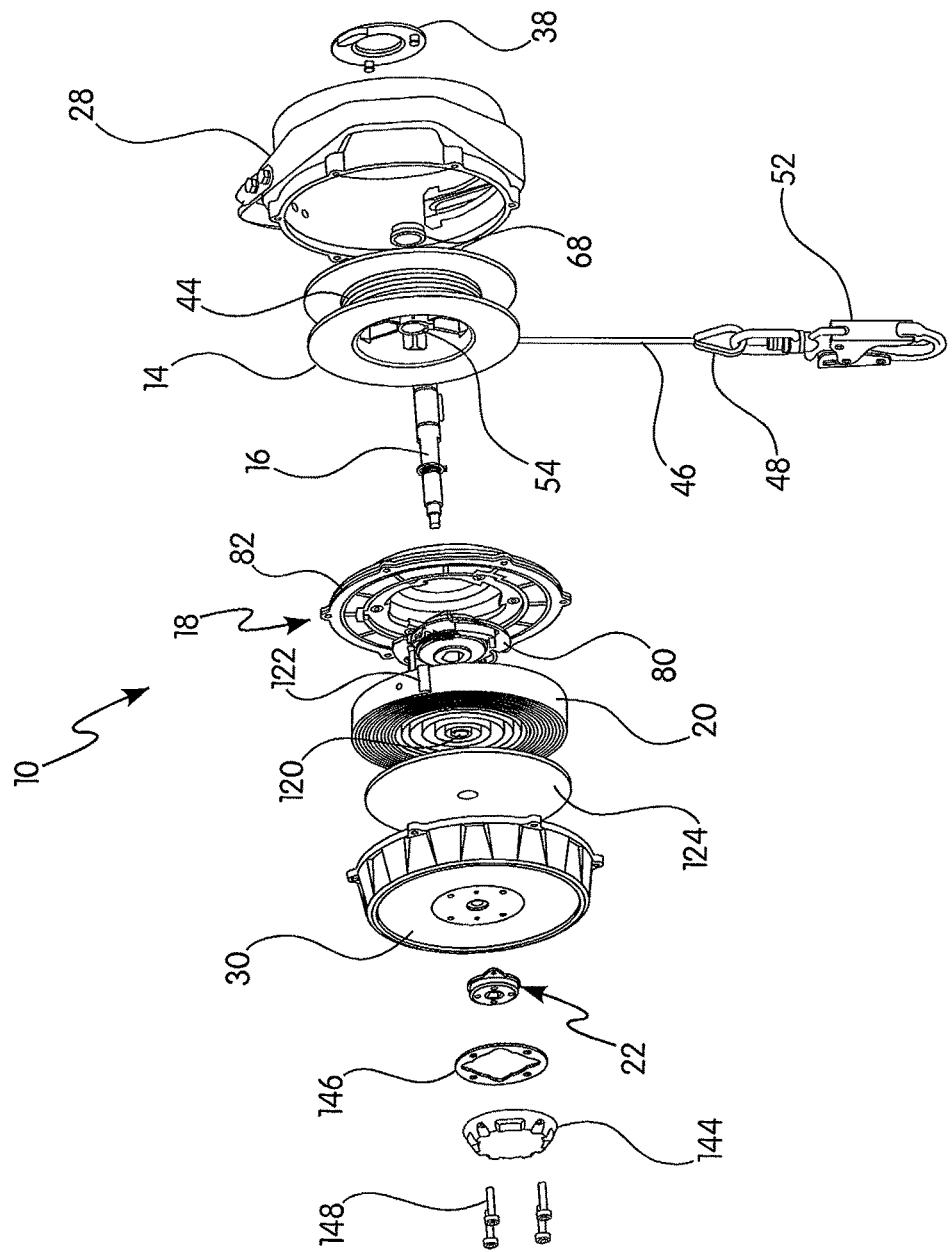
FIG. 5 is an exploded, perspective view of the fall protection device of FIG. 1 according to one aspect of the present invention.
Figure 6:
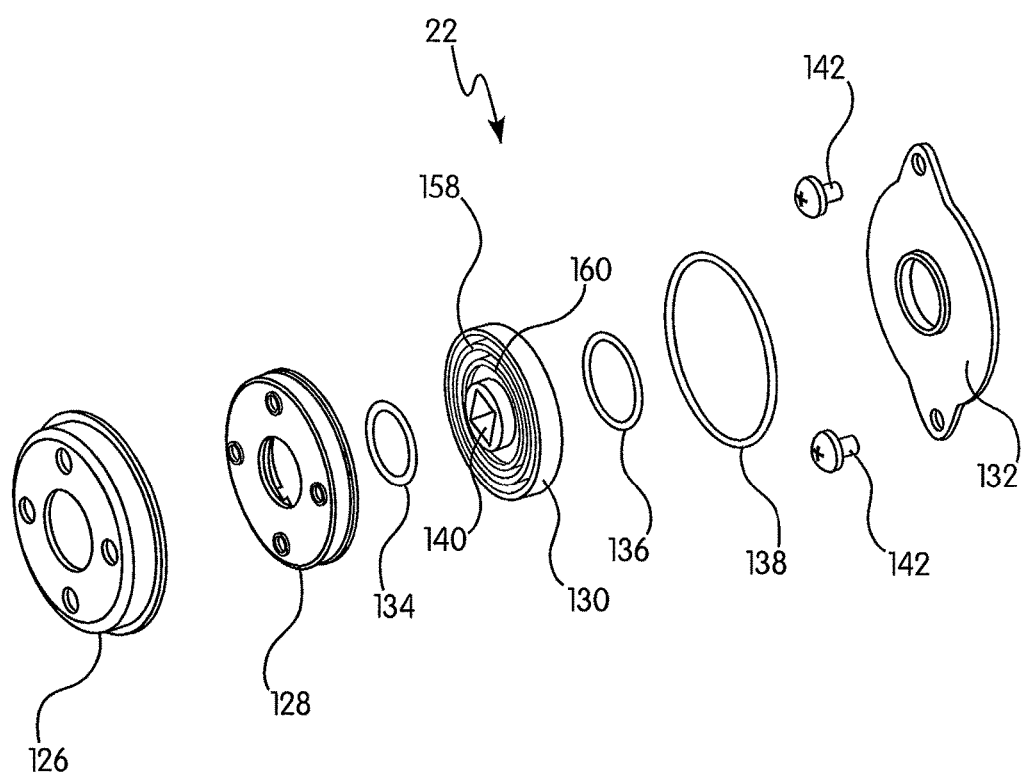
FIG. 6 is an exploded, front perspective view of a damper assembly according to one aspect of the present invention.
Figure 7:
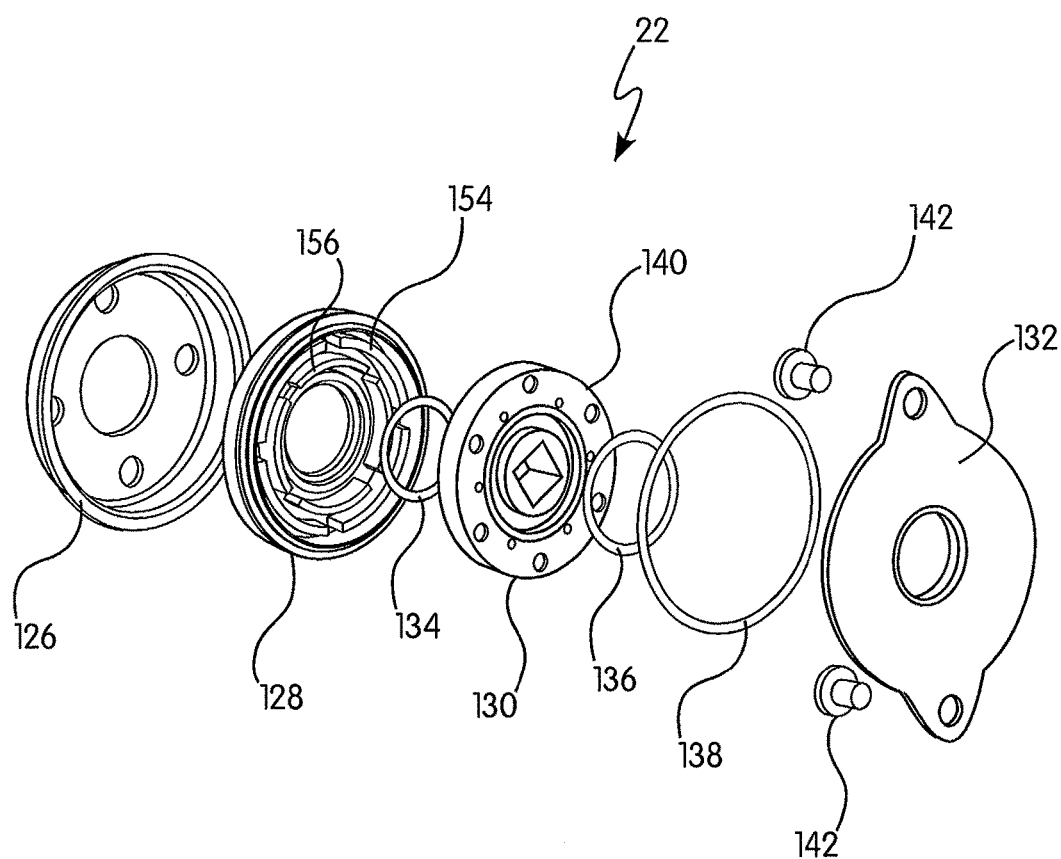
FIG. 7 is an exploded, rear perspective view of the damper assembly of FIG. 6 according to one aspect of the present invention.
Figure 8:
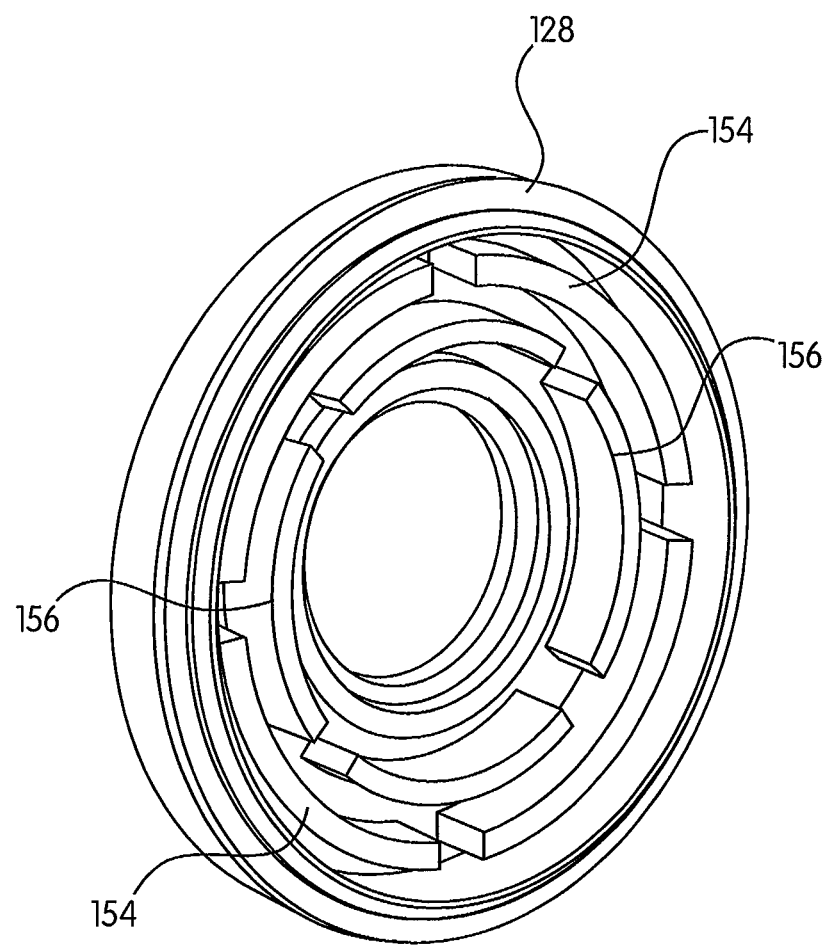
FIG. 8 is a rear perspective view of at least one fixed element according to one aspect of the present invention.
Figure 9:
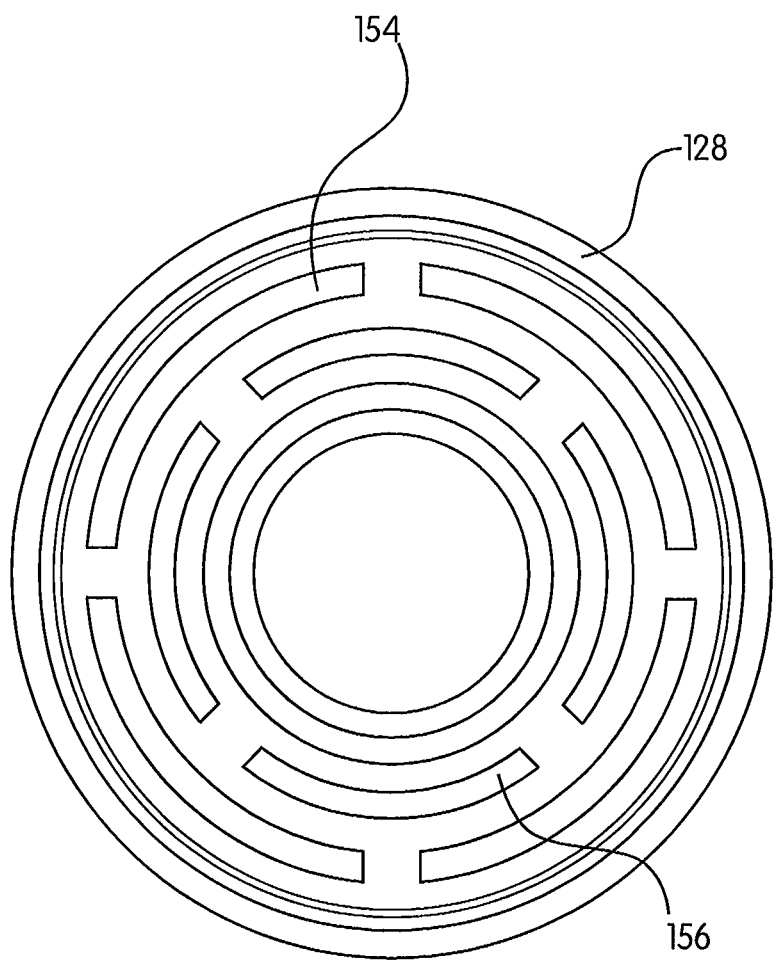
FIG. 9 is a rear view of the at least one fixed element of FIG. 8 according to one aspect of the present invention.
Figure 10:
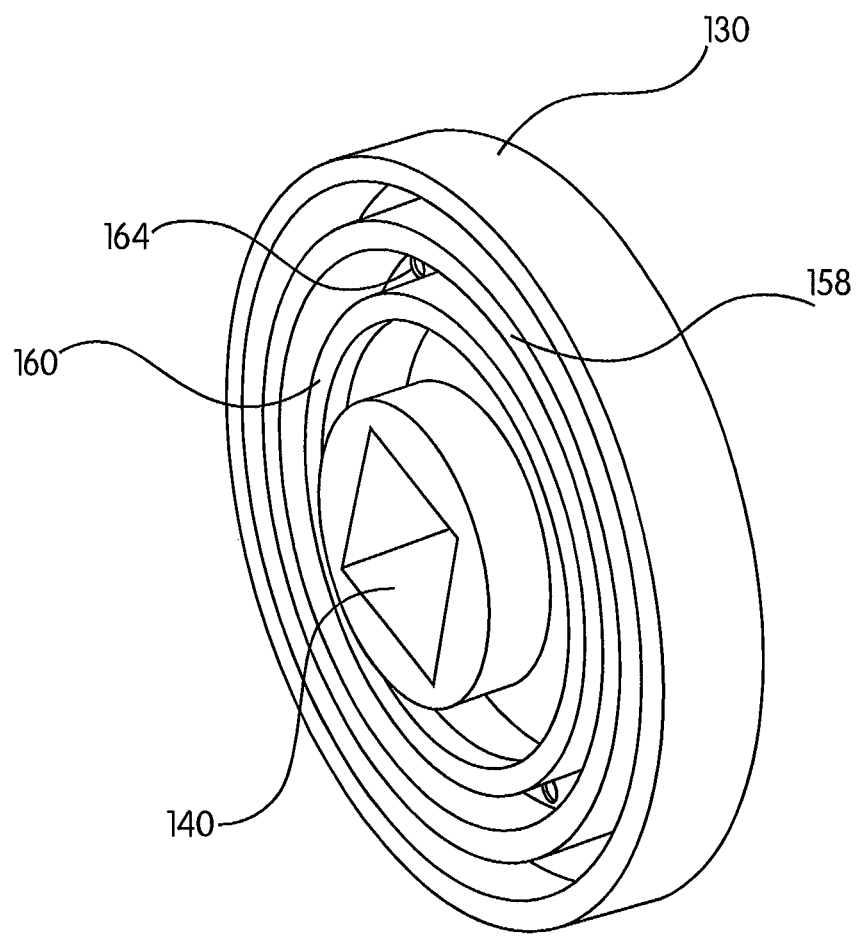
FIG. 10 is a front perspective view of at least one moveable element according to one aspect of the present invention.
Figure 11:
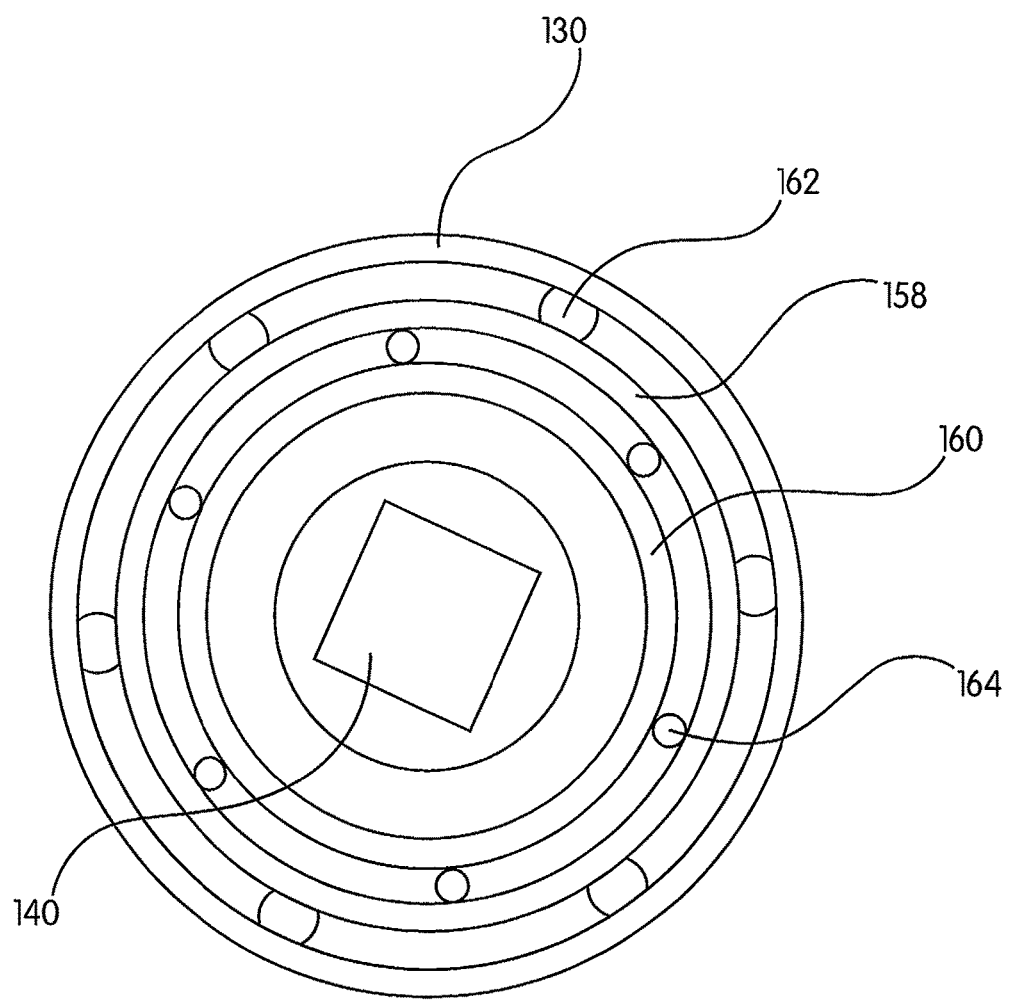
FIG. 11 is a front view of the at least one moveable element of FIG. 10 according to one aspect of the present invention.
Figure 12:
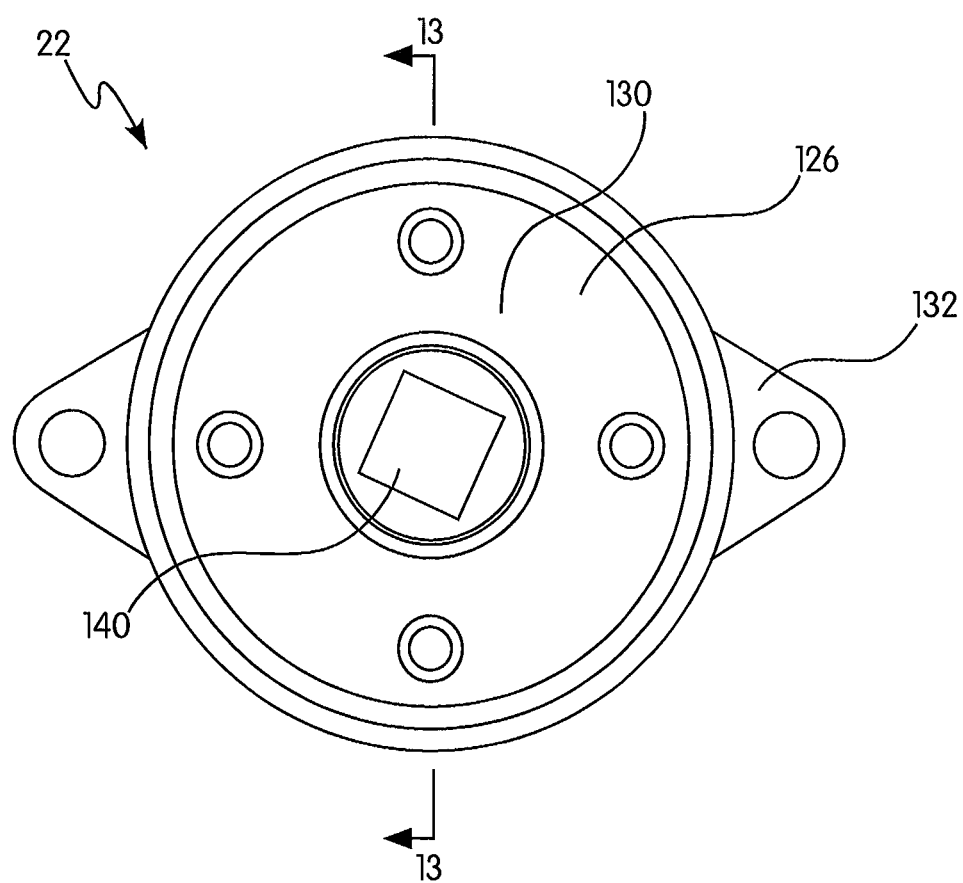
FIG. 12 is a front view of the damper assembly according to one aspect of the present invention.
Figure 13:
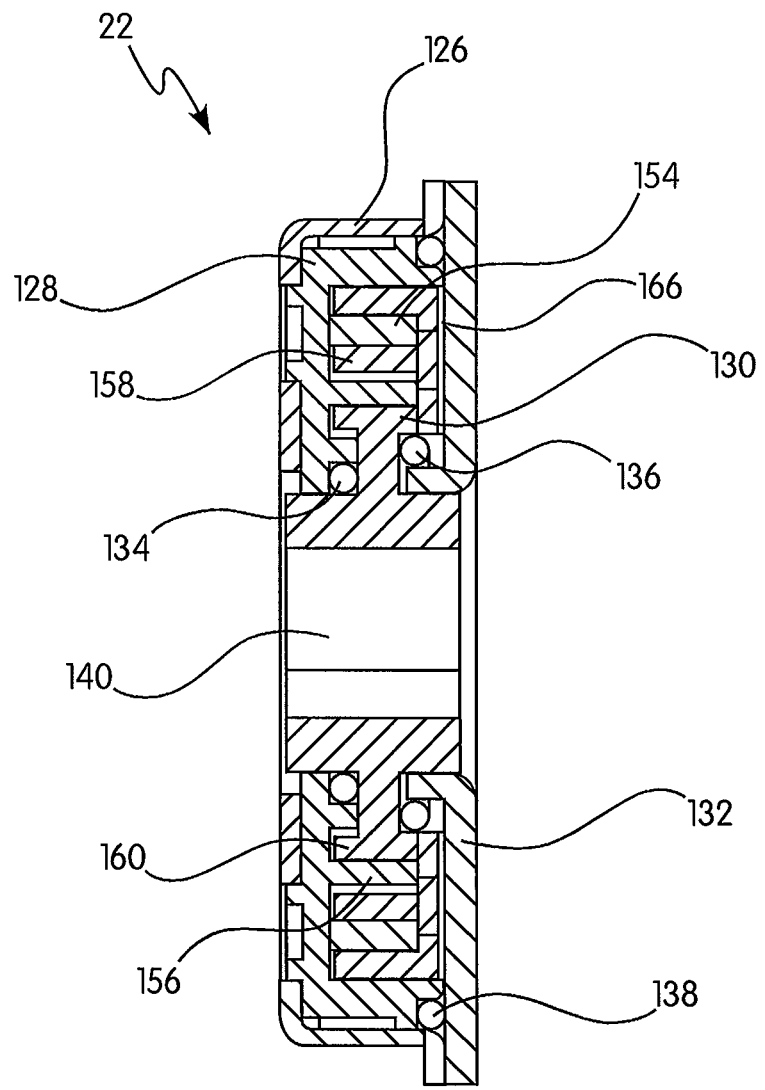
FIG. 13 is a cross-sectional view along line 13-13 shown in FIG. 12 according to one aspect of the present invention.
Figure 14:
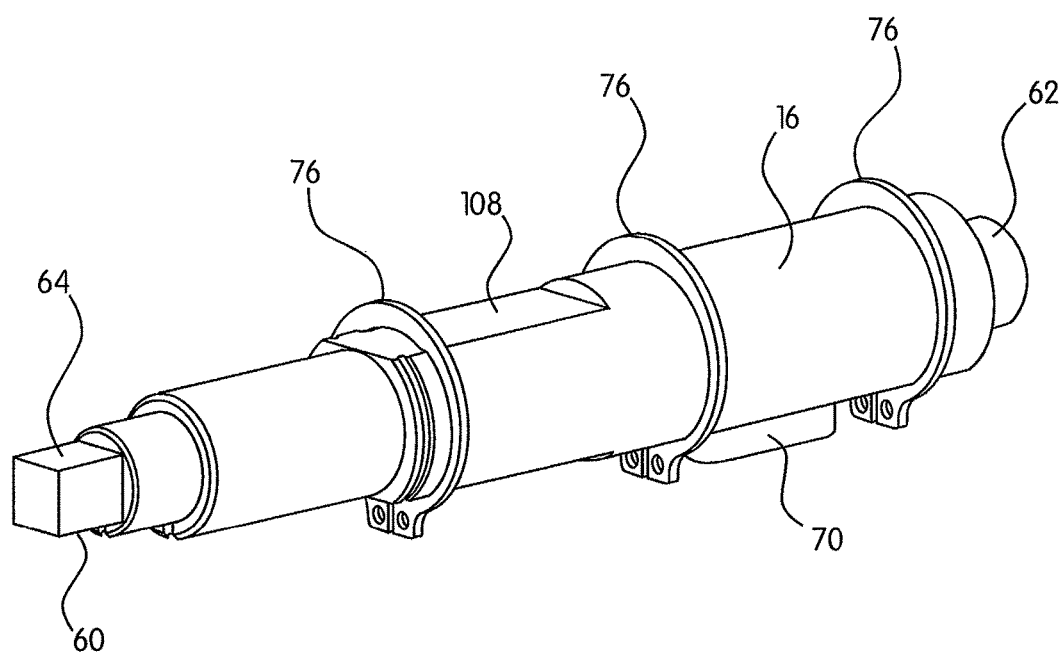
FIG. 14 is a side perspective view of a shaft according to one aspect of the present invention.
Figure 15:
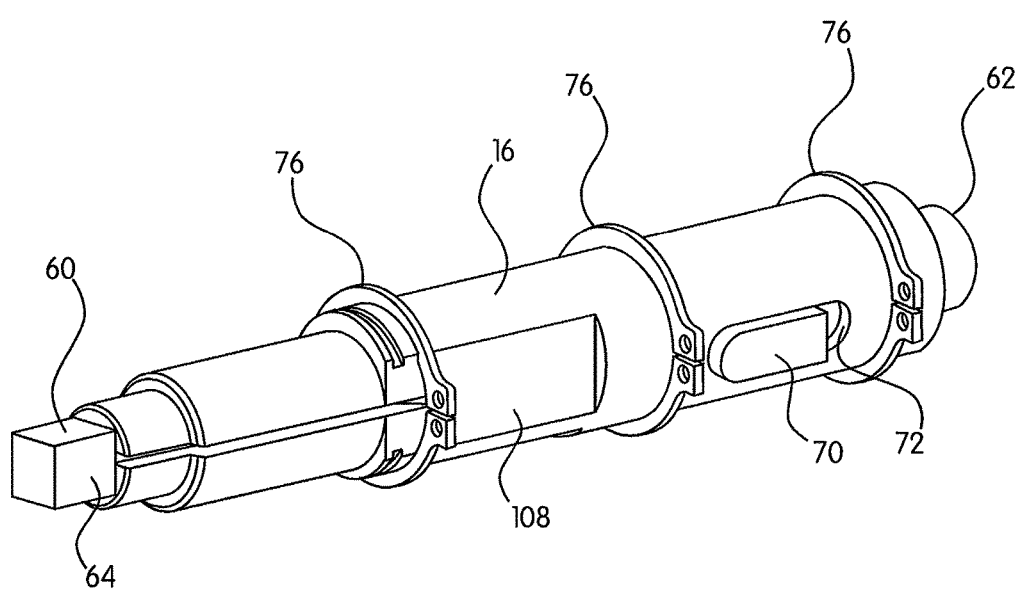
FIG. 15 is a bottom perspective view of the shaft of FIG. 14 according to one aspect of the present invention.
Figure 16:
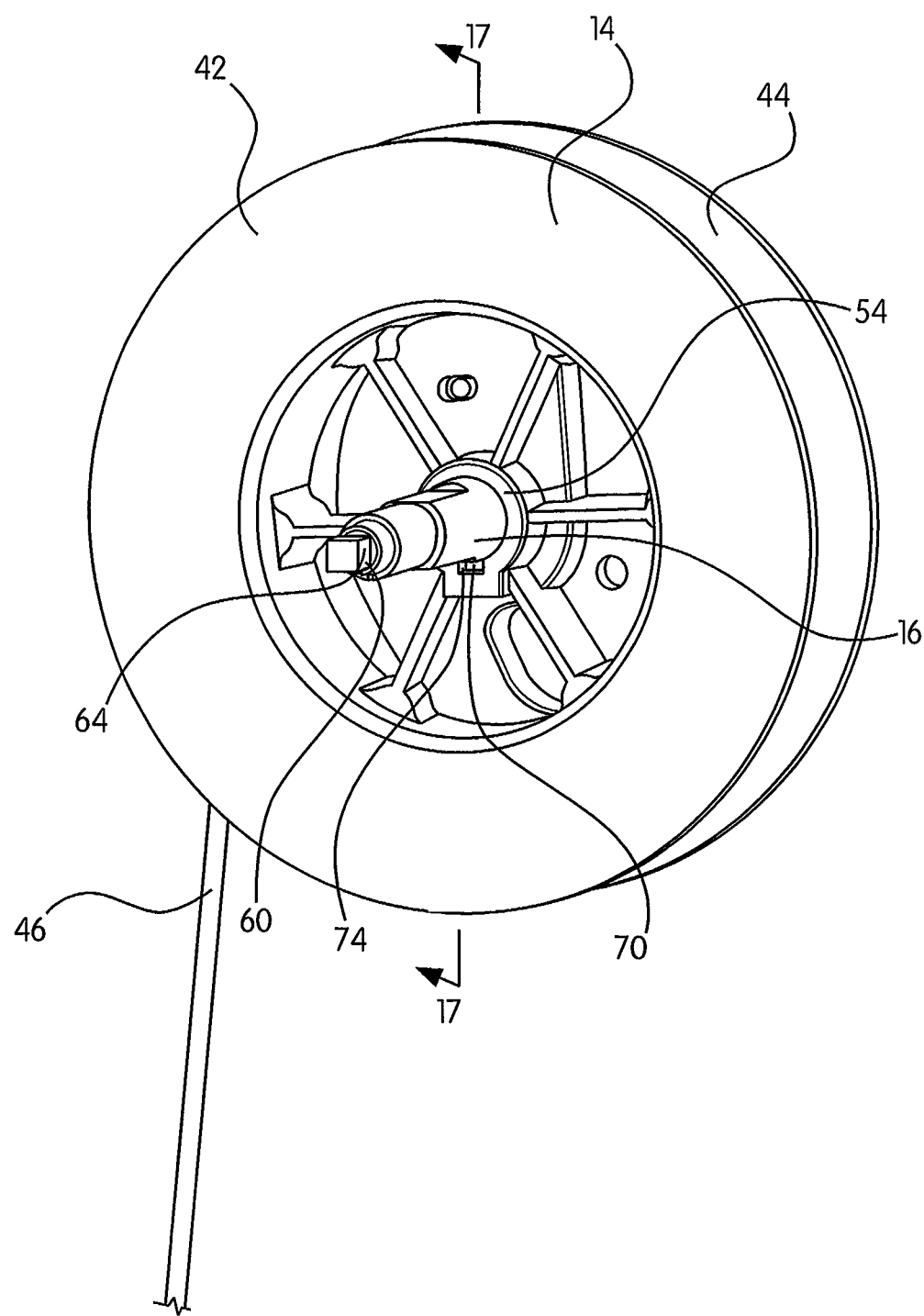
FIG. 16 is a front view of a drum and shaft assembly according to one aspect of the present invention.
Figure 17:
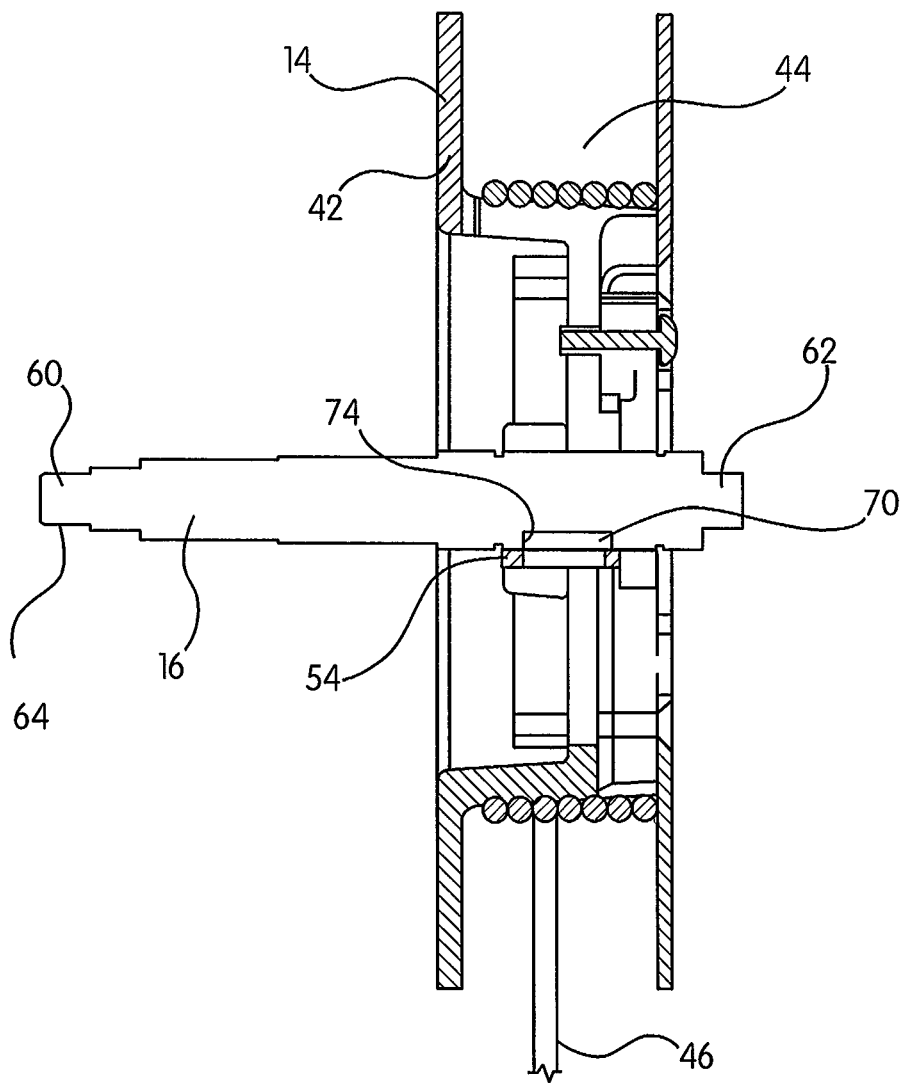
FIG. 17 is a cross-sectional view along line 17-17 shown in FIG. 16 according to one aspect of the present invention.

Referring to FIGS. 4 and 5, the retraction member 20 is received by the spring cover 30 of the housing assembly 12. The retraction member 20 is connected to the drum 14 and configured to bias the drum 14 in a first rotational direction that retracts the line 46 back onto the drum 14 and opposite to a second rotational direction of the drum 14 where the line 46 is paid out from the drum 14. In one preferred and non-limiting embodiment or aspect, the retraction member 20 is embodied as a power spring, although any other suitable retraction members to bias the drum in the first rotational direction may be utilized. The power spring may have a first end fixed relative to the housing assembly 12 and a second end secured directly or indirectly to the drum 14, such as directly or indirectly to the shaft 16. The retraction member 20 includes a first end 120 fixed relative to the housing assembly 12 and a second end 122 secured to the shaft 16. In particular, the first end 120 of the retraction member 20 is secured to the spring cover 30. A disc plate 124 may cover the retraction member 20 within the spring cover 30.

Referring to FIGS. 5-13, and in one preferred and non-limiting embodiment or aspect, the damper assembly 22 includes a damper main housing 126 that receives at least one fixed element 128 (which, in one preferred and non-limiting embodiment or aspect, may be in the form of at least one fixed vane) and at least one moveable element 130 (which, in one preferred and non-limiting embodiment or aspect, may be in the form of at least one moveable vane), as well as a damper cover 132 to enclose the damper main housing 126. The damper main housing 126 may be secured to the damper cover 132 via any suitable arrangement, including a friction fit over the at least one fixed element 128, a fastener, adhesive, and the like. The damper main housing 126 also may receive or contain a damping fluid that is in fluid communication with the at least one fixed element 128 and the at least one moveable element 130. In one preferred and non-limiting embodiment or aspect, the damping fluid is a silicone fluid, although other suitable damping fluids, e.g., viscous fluids, may be utilized.

In this embodiment or aspect, the damper assembly 22 also includes a front seal 134, a rear seal 136, and a housing seal 138 to seal the damping fluid within the damper main housing 126. The at least one moveable element 130 moves in conjunction with the drum 14 via connection of the at least one moveable element 130 to the shaft 16. In particular, the engagement surface 64 at the first end 60 of the shaft 16 is received by a corresponding recess 140 defined by or associated with the at least one moveable element 130, such that the shaft 16 is rotationally fixed relative to the at least one moveable element 130. The damper assembly 22 provides a rotational resistance to the drum 14 through the movement of the at least one moveable element 130 relative to the at least one fixed element 128 in the damping fluid.

In one preferred and non-limiting embodiment or aspect, the damper assembly 22 is secured to an outer surface of the spring cover 30 via bolts 148, although any other suitable securing arrangement may be utilized. An outer cover 144 and pad 146 are positioned over the damper assembly 22 and secured to the spring cover 30 with bolts 148. In another preferred and non-limiting embodiment or aspect, the damper assembly 22 is directly or indirectly secured or mounted to the drum 14, such as in an embodiment where the shaft 16 does not rotate. Although the damper assembly 22 is shown as a fluid-type damper arrangement, other suitable damper arrangements, such as a friction-type damper, may be utilized, which includes contacting frictional surfaces. In particular, in friction-type damper arrangements, a moveable element engages a fixed element during relative rotation to provide rotational resistance.

Referring to FIGS. 6-13, and in one preferred and non-limiting embodiment or aspect, the at least one fixed element 128 includes a first set of arcuate-shaped vanes 154 radially spaced from a second set of arcuate-shaped vanes 156. The first set of vanes 154 and the second set of vanes 156 are each arranged in a substantially circular shape. The at least one moveable element 130 includes a first annular vane 158 radially spaced from a second annular vane 160. The first and second annular vanes 158, 160 of the at least one moveable element 130 are intermeshed with the first and second sets of vanes 154, 156 of the at least one fixed element 128. In one preferred and non-limiting embodiment or aspect, the at least one moveable element 130 also includes a first set of openings 162 radially spaced from a second set of openings 164. The first set of openings 162 are positioned radially outward from the first annular vane 158 and the second set of openings 164 are positioned between the first and second annular vanes 158, 160. In this embodiment or aspect, the first set of openings 162 are larger than the second set of openings 164, although other suitable arrangements and sizes may be utilized. A gap 166 is defined between the at least one moveable element 130 and the damper cover 132 such that the first set of openings 162 are in fluid communication with the second set of openings 164, thereby allowing damping fluid to pass between the first and second annular vanes 158, 160.

The shearing resistance of the damping fluid between the vanes 154, 156, 158, 160 of the at least one moveable element 130 and the at least one fixed element 128 provides the rotational resistance to the drum 14 during retraction and payout of the line 46. The retraction velocity of the line 46 is controlled at a desired level via the geometry of the at least one fixed element 128 and the at least one moveable element 130, as well as the viscosity of the damping fluid. The damper assembly 22 prevents freewheeling of the line 46 and the end connector 52 (and the associated damage caused by impacts of the end connector 52 against the housing assembly 12). The torque provided by the damper assembly 22 increases as the rotational speed of the shaft 16 increases. As the drum 14 accelerates during retraction of the line 46, the at least one moveable element 130 also accelerates via the shaft 16 until the torque from the damper assembly 22 counters the torque generated by the retraction member 20.

At this point, the retraction velocity remains constant due to the torque of the retraction member 20 being countered by the damper assembly 22. As the line 46 continues to be retracted, the torque generated by the retraction member 20 will decrease with the torque from the damper assembly 22 also decreasing, thereby resulting in a reduced retraction velocity, which will continue until the line 46 is fully retracted into the housing assembly 12. Accordingly, the damper assembly 22 provides a controlled and smooth retraction of the line 46 back into the housing assembly 12 and prevents damage to the housing assembly 12, end connector 52, and internal components, impact of the end connector 52 with the user, and also prevents jamming of the line retraction device 10.

The damper assembly 22 also provides resisting torque when the drum 14 pays out the line 46. Although the payout torque from the damper assembly 22 may provide resistance to a user walking away from the housing assembly 12, the torque is low enough that any additional effort required of the user will likely not be noticeable by the user. In particular, the force provided by the retraction member 20 is great enough that the effect of the additional torque from the damper assembly 22 on the line 46 as it pays out will not be noticed by the user. Further, the line retraction device 10 will perform in the same manner during a fall event with or without the damper assembly 22. Accordingly, providing a damper assembly 22 that provides resistance in both rotational directions of the drum 14 eliminates the need for a one-way engagement mechanism or clutch, which reduces the complexity and cost and increases the reliability of the line retraction device 10.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A line retraction device, comprising:
   a rotatable drum having a line associated therewith, the line including a first end directly or indirectly attached to the drum and a second end opposite the first end;
   at least one retraction member biasing the drum in a first rotational direction of the drum opposite a second rotational direction of the drum, wherein the drum is configured to: (i) retract the line when the drum moves in the first rotational direction; and (ii) payout the line when the drum moves in the second rotational direction;
   a brake assembly configured to prevent rotation of the drum upon activation of the brake assembly; and
   a damper assembly having a damper housing with at least one fixed element and at least one moveable element movable in conjunction with the drum, the damper housing containing a fluid in fluid communication with at least a portion of the at least one fixed element and at least a portion of the at least one moveable element,
   wherein the at least one fixed element comprises a first set of arcuate-shaped vane segments radially spaced from a second set of arcuate-shaped vane segments, the vane segments of the first set and the second set circumferentially spaced apart from each other and arranged in a circular shape, wherein the at least one moveable element comprises a first annular vane radially spaced from a second annular vane, the first and second annular vanes of the at least one moveable element intermeshed with the first and second sets of vane segments of the at least one fixed element, and wherein a shearing resistance of the fluid between the at least one fixed element and the at least one movable element is configured to provide rotational resistance to the drum in: (i) the first rotational direction of the drum as the line is being retracted; and (ii) the second rotational direction as the line is being paid out.

2. The line retraction device of claim 1, further comprising a shaft having a first end and a second end, the shaft connected to and rotatable with the drum, the at least one moveable element connected to the shaft.

3. The line retraction device of claim 1, wherein the fluid comprises a silicone fluid.

4. The line retraction device of claim 1, further comprising a housing assembly that receives the drum and the retraction member, the retraction member comprising a power spring having a first end fixed relative to the housing assembly and a second end secured directly or indirectly to the drum.

5. The line retraction device of claim 4, wherein the housing assembly comprises a main housing and a cover, and wherein the damper assembly is secured to at least one of the following: a side of the cover, a shaft, the drum, or any combination thereof.

6. The line retraction device of claim 1, wherein the brake assembly comprises a speed-sensitive mechanism having an activated position and a non-activated position, the speed-sensitive mechanism rotatable in conjunction with the drum and configured to transition from the non-activated position to the activated position upon a predetermined rotation speed of the drum.

7. The line retraction device of claim 1, wherein the retraction member comprises a power spring.

8. The line retraction device of claim 1, wherein an end connector is secured to the second end of the line, the end connector configured to be releasably connected to a user of the line retraction device.

9. A line retraction device, comprising:
a housing;
a rotatable drum received at least partially within the housing and having a line associated therewith, the line including a first end directly or indirectly attached to the drum and a second end opposite the first end;
at least one retraction member biasing the drum in a first rotational direction of the drum opposite a second rotational direction of the drum, wherein the drum is configured to: (i) retract the line when the drum moves in the first rotational direction; and (ii) payout the line when the drum moves in the second rotational direction;
a brake assembly configured to prevent rotation of the drum upon activation of the brake assembly; and
a damper assembly having a damper housing with at least one fixed element and at least one moveable element movable in conjunction with the drum, the damper housing containing a fluid in fluid communication with at least a portion of the at least one fixed element and at least a portion of the at least one moveable element, wherein the at least one fixed element comprises a first set of arcuate-shaped vane segments radially spaced from a second set of arcuate-shaped vane segments, the vane segments of the first set and the second set circumferentially spaced apart from each other and arranged in a circular shape, wherein the at least one moveable element comprises a first annular vane radially spaced from a second annular vane, the first and second annular vanes of the at least one moveable element intermeshed with the first and second sets of vane segments of the at least one fixed element, and wherein a shearing resistance of the fluid between the at least one fixed element and the at least one movable element is configured to provide rotational resistance to the drum in: (i) the first rotational direction of the drum as the line is being retracted; and (ii) the second rotational direction as the line is being paid out.

10. The line retraction device of claim 9, wherein the housing receives the drum and the retraction member, the retraction member comprising a power spring having a first end fixed relative to the housing assembly and a second end secured directly or indirectly to the drum.

11. A fall protection device, comprising:
a rotatable drum having a line associated therewith, the line including a first end directly or indirectly attached to the drum and a second end opposite the first end;
at least one retraction member biasing the drum in a first rotational direction of the drum opposite a second rotational direction of the drum, wherein the drum is configured to: (i) retract the line when the drum moves in the first rotational direction; and (ii) payout the line when the drum moves in the second rotational direction;
a brake assembly having a speed-sensitive mechanism having a non-activated position and an-activated position configured to prevent rotation of the drum; and
a damper assembly having a damper housing with at least one fixed element and at least one moveable element movable in conjunction with the drum, the damper housing containing a fluid in fluid communication with at least a portion of the at least one fixed element and at least a portion of the at least one moveable element, wherein the at least one fixed element comprises a first set of arcuate-shaped vane segments radially spaced from a second set of arcuate-shaped vane segments, the vane segments of the first set and the second set circumferentially spaced apart from each other and arranged in a circular shape, wherein the at least one moveable element comprises a first annular vane radially spaced from a second annular vane, the first and second annular vanes of the at least one moveable element intermeshed with the first and second sets of vane segments of the at least one fixed element, and wherein a shearing resistance of the fluid between the at least one fixed element and the at least one movable element is configured to provide rotational resistance to the drum in: (i) the first rotational direction of the drum as the line is being retracted; and (ii) the second rotational direction as the line is being paid out.

* * * * *